United States Patent [19]
Myers et al.

[11] 4,272,927
[45] Jun. 16, 1981

[54] METHOD OF MANUFACTURING A BROACHING TOOL

[75] Inventors: Julius D. Myers, Lake Orion; John X. Russell, Troy, both of Mich.

[73] Assignee: The Babcock & Wilcox Company, New Orleans, La.

[21] Appl. No.: 102,205

[22] Filed: Dec. 10, 1979

Related U.S. Application Data

[63] Continuation of Ser. No. 895,903, Apr. 13, 1978, abandoned.

[51] Int. Cl.³ .............................................. B24B 1/00
[52] U.S. Cl. ...................................... 51/322; 51/288; 51/327; 76/101 R
[58] Field of Search .................... 51/281 R, 283, 288, 51/327, 322; 76/101 R

[56] References Cited

U.S. PATENT DOCUMENTS

| 2,163,687 | 6/1939 | Jacobsen | 51/322 |
| 2,536,864 | 1/1951 | Strickland | 51/288 |
| 2,889,669 | 6/1959 | Babbitt | 51/288 |
| 3,461,748 | 8/1969 | Meyer | 51/288 X |
| 3,553,909 | 1/1971 | Tersch | 51/288 X |
| 3,984,213 | 10/1976 | Kelso | 51/281 R |

OTHER PUBLICATIONS

*Grindmy Technology* by Krar & Oswald, Delmar Publishers, 1974, (Units 4 & 55).

*Primary Examiner*—Gary L. Smith
*Attorney, Agent, or Firm*—Vytas R. Matas; Joseph M. Maguire

[57] ABSTRACT

A broaching tool is manufactured directly from a heat hardened blank of preformed metal by having a grinding wheel of CBN (cubic boron nitride) material cut a broach tooth from the hardened blank by cutting gullets in the blank. The blank is made movable and rotatable relative to the CBN grinding wheel to allow the manufacture of a series of broach teeth forming a broaching tool with various tooth spacings, depths, and angles with respect to the face of the broaching tool.

3 Claims, 5 Drawing Figures

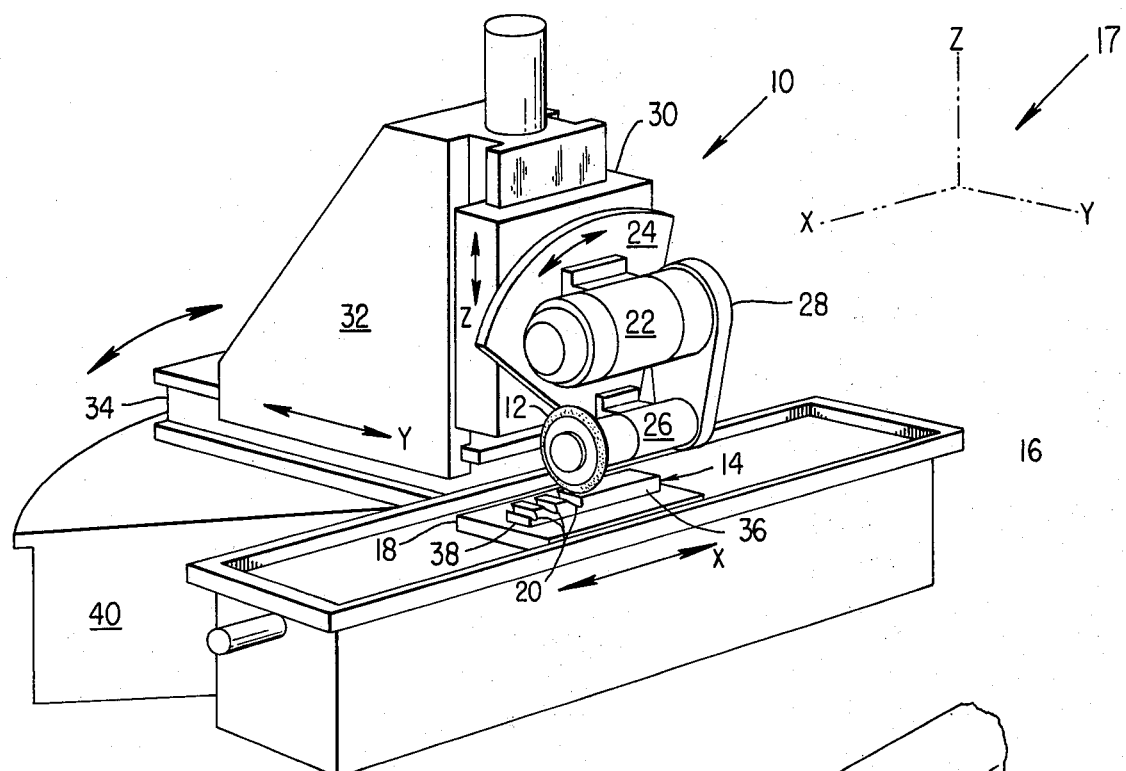
FIG. 1
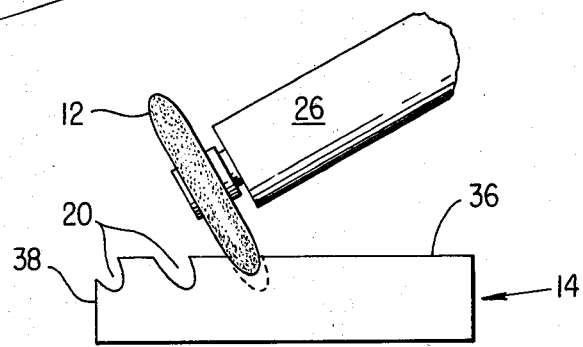
FIG. 2
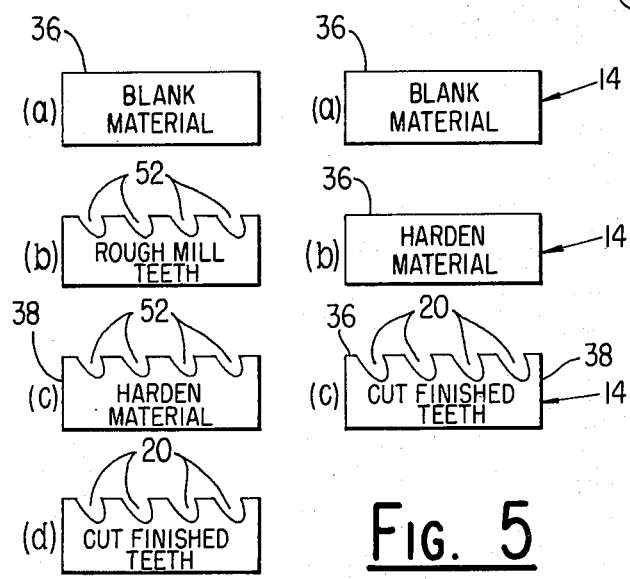
FIG. 5
FIG. 4
PRIOR ART
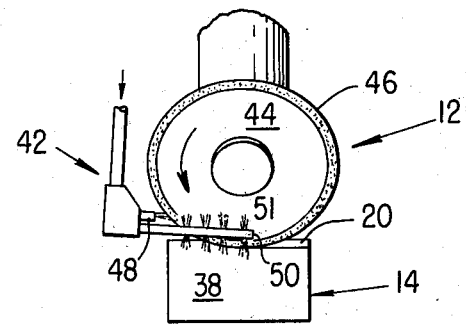
FIG. 3

METHOD OF MANUFACTURING A BROACHING TOOL

This is a continuation of application Ser. No. 895,903, filed Apr. 13, 1978, now abandoned.

BACKGROUND OF THE INVENTION

1. Field of the Invention

The present invention relates generally to methods of manufacturing broaching tools and particularly to a method of manufacturing a broaching tool directly from a preformed blank of heat hardened metal.

2. Description of the Prior Art

Known prior art methods of manufacturing broaching tools involved a two-step operation requiring first an initial rough milling of gullets in a soft blank of metal followed by finish grinding the gullets to form the finished teeth therein once the metal had been heat hardened.

In the initial operation a blank bar of soft unhardened metal was roughly cut to the size requirements of the finished broach. This soft bar of metal was then milled to provide a taper to the bar which gave the finished broach the requisite rise to allow the broaching by the finished tool to be progressively accomplished. With the metal in the unhardened stage, the rough form of the cutting teeth were milled by milling a series of gullets at predetermined spaces in the unhardened metal. Once these operations were completed the metal was put through a heat treating process to harden the metal and provide a keen hardened edge to the finished broaching tool. Heat transfer characteristics of the metal had to be considered during the heat treating process to prevent the creation of cracks in the rough formed cutting teeth of the broach. Once the metal was hardened, the final broach teeth were finished cut in the hardened metal generally using an aluminum oxide cutting wheel.

The reason for this two-stage process in the prior art methods of manufacturing broaching tools was mainly one of speed and economy. It was found that soft metal such as steel may be cut faster by milling. It was also found impossible to mill the final form of the cutting teeth in the soft metal such as steel since distortions occurred during the heat treating, hardening, process. Thus, only the rough form of the teeth were milled in the soft steel followed by finish grinding of the final tooth form using an aluminum oxide wheel on the hardened and rough cut metal bar.

Prior art grinding wheels using aluminum oxide could not cut the finished teeth directly from a hardened blank of metal in the same time as the above two-stage operation since attempts at high speed deep cutting of gullets in the hardened metal blank caused the wheel to quickly deteriorate and the hardened material to develop heat burn spots.

Examples of such known prior art methods of grinding as described may be found in U.S. Pat. No. 3,984,213 which utilizes known grinding techniques using aluminum oxide wheels and in U.S. Pat. No. 2,889,669 which teaches known slow methods of grinding hardened metals.

From the foregoing it may be seen that the prior art two-stage method of manufacturing broaching tools was relatively slow and required a number of operations. Clearly, what was needed was a method of quickly cutting finished broaching teeth to form a broaching tool directly from hardened metal such as steel.

SUMMARY OF THE INVENTION

The present invention solves the problems associated with the prior art methods of manufacturing broaching tools as well as others by providing a method for manufacturing a broaching tool wherein finished broach teeth may be cut directly from hardened blank metal material such as steel. To accomplish this, a grinding wheel of CBN (cubic boron nitride) material is used to make cuts of up to 0.09 inches depth directly into hardened metal materials to thereby quickly and economically produce finished cutting teeth for a broaching tool directly from the hardened metal blank.

The CBN grinding wheel is mounted so as to be able to move up and down and across with respect to the hardened blank of metal material as well as being able to be angled with respect thereto. Thus, the tooth angle and depth may be easily controlled. The blank hardened metal material is made to move laterally with respect to the grinding wheel to thus provide the predetermined tooth spacing or pitch.

In view of the foregoing, it will be seen that one aspect of the present invention is to provide a method of manufacturing broach cutting teeth directly from a hardened blank of metal material.

Another aspect of the present invention is to provide a method of manufacturing a broaching tool which is significantly faster than prior art manufacturing methods.

These and other aspects of the present invention will be more clearly understood upon a review of the following description of the preferred embodiment considered with the drawings.

BRIEF DESCRIPTION OF THE DRAWINGS

FIG. 1 is a perspective view of an NC grinding machine utilized to manufacture the broaching tools of the present invention.

FIG. 2 is an expanded view of the grinding operation of the FIG. 1 machine.

FIG. 3 is an expanded view of the cutting wheel of the FIG. 1 machine showing the cooling nozzle position with respect to the wheel.

FIG. 4 is a schematic step diagram of prior art method steps of manufacturing broach cutting teeth.

FIG. 5 is a schematic of the method steps of manufacturing broach cutting teeth of the present invention.

DESCRIPTION OF THE PREFERRED EMBODIMENT

Referring now to the drawings, FIG. 1 shows an NC (numerical control) grinding machine 10 which was adapted to utilize a CBN 500 (cubic boron nitride) material wheel 12 to manufacture a broaching tool 14 directly from a heat hardened preformed blank of metal such as steel.

The NC grinding machine 10 has a table 16 which is incrementally movable in a reciprocating manner along the X axis of the 3 dimensional orientation schematic 17 in response to control signals provided to the NC grinding machine in a well-known manner. A mounting block 18 is located on the table 16 to be movable therewith and the hardened metal blank 14 is mounted to the block 18 to be movable therewith. The table 16 is controlled so as to be incrementally moved after each cyclic pass of the wheel 12 to thereby allow the cutting of properly spaced multiple broach tooth gullets 20 according to the controlled predetermined spacing determined by the incremental movement of the table 16 along the X axis.

The CBN wheel 12 is motor driven by a motor 22 mounted to a member 24 which also has the wheel 12 spindle 26 mounted thereto. The wheel 12 is rotated by the motor 22 through a belt drive (not shown) enclosed in a belt shield 28. The member 24 is rotatably mounted in the XZ plane to an elevator 30 which allows the wheel 12 to be moved up and down along a frame 32 to thereby provide a predetermined depth of cut by the wheel 12 into the broach tool 14 as it passes across the blank 14 in the Y direction to cut the requisite depth of the gullets 20.

The frame 32 is mounted onto a slide 34 and it is reciprocally movable in the Y direction along the slide 34 to allow the wheel 12 to move across a face 36 of the blank tool 14 thereby cutting the gullets into the broach tool 14.

Thus the basic operation of the NC grinding machine 10 would be as follows. The table 16 is moved in the X direction with respect to the retracted wheel 12 which remains retracted in a position along the Y direction until the leading edge 38 of the broach tool blank 14 is aligned with the wheel 12. The elevator 30 is then moved to orient the wheel 12 down with respect to the blank tool 14 to a depth which will allow the cutting of the gullets 20 of a predetermined desired depth. This cutting may be done in a single pass of the wheel 12 or in multiple passes of the wheel 12 as determined by the depth of the requisite gullets 20 as compared to the metal removal capabilities of the preset wheel speed and cooling parameters. The frame 32 is then controllably moved in a Y direction to allow the wheel 12 to move across the face 36 of the broach tool 14 cutting a gullet 20 across the face 36 of the broach tool 14. The frame 32 is then retracted along the cut gullet 20 and the wheel 12 is lowered along the Z axis for multiple pass deep gullet cutting or the table 16 is incrementally moved in the X direction to a new position which will provide the predetermined spacing between gullets 20 and teeth members formed thereby. The above-described operation is repeated until all the gullets 20 and thus broach teeth are cut in the blank tool 14 to provide a finished broaching tool.

Since the gullets 20 as cut by the wheel 12 and the broach teeth formed between the gullets 20 must be of various angles for various broaches, the member 24 is made rotatable in the XZ plane to angularly orient the wheel 12 with respect to the blank tool 14 to the predetermined angle required by a particular broach to provide an angular cut of the gullets 20 as required. This angular orientation of the wheel 12 with respect to the blank tool 14 may be best seen in FIG. 2.

It will be also appreciated that the gullets 20 may be cut at an angle with respect to the face 36 of the blank tool 14. To accomplish this the slide 34 is made rotatable on a frame 40 to thereby change the orientation of the wheel 12 in the XY plane. This orientation allows the wheel 12 to cut across the face 36 at any desired angle.

As in all cutting and grinding operations, the cooling of the cutting wheel 12 is of great importance and determines the wheel 12 life and the amount of metal removed per pass of the wheel 12 without burning the blank tool 14. Referring now with particular emphasis to FIG. 3, it will be seen that a cooling fluid assembly 42 is mounted proximately to the wheel 12 to be movable with the wheel 12 and to provide adequate cooling fluid to the wheel 12 as it cuts a gullet 20 in the blank tool 14. Since the coolant fluid must be matched to the particular wheel 12 a more detailed look at the cutting wheel 12 and its coolant is now in order. The cutting wheel 12 is formed from a steel blank 44 having a plated layer of CBN 500 material 46 bonded along the periphery of the steel blank 44. The layer 46 is approximately 12.5 percent by volume of CBN 500 to a metal amalgam binder entitled M3 and available from Wickman Corporation of Oak Park, Mich. CBN 500 is a 120 grit material entitled Borazon CBN 500 and is available from General Electric Company. The described wheel is operated at a peripheral speed of 11,500 surface feet, and is thus able to cut hardened blank 14 steel materials such as M2 and M3 which are steel blanks 14 hardened to 63.5 to 67 Rockwell C hardness. The described wheel 12 is thus able to cut the steel blanks 14 to a depth of approximately 0.06 to 0.09 inches when traveling at a rate of 2 to 6 inches per minute across the face 36 of the blank 14. Under the foremention conditions a synthetic coolant entitled TRIM HD available from Master Chemical Corporation of Perrysburg, Ohio is exhausted at the wheel 12 at a rate of 30 gallons per minute from the cooling fluid assembly 42. The cooling fluid assembly 42 is a three nozzle assembly which matches the contour of the wheel 12 and provides the exhaust of fluid onto the front face of the wheel from a nozzle 48 having a single end located exhaust and to the sides of the wheel 12 from a pair of side nozzles 50 having a series of orifices 51 along the length of each nozzle 50 exhausting on the sides of the wheel 12.

Turning now to FIGS. 4 and 5, it will be seen that the method of cutting finished teeth in a hardened steel blank of the present invention is faster and less expensive than the prior art methods. In the prior art methods of manufacturing a broach tool the unhardened blank of steel, which may have already had a taper cut to it, required a rough milling operation which formed a series of rough milled gullets 52. This milling operation on soft steel was required since milling the finished gullets 20 would have been impossible once the blank was hardened. The blank with the rough milled gullets 52 was then heat hardened to provide the strength to the ultimate broach tool and then the gullets 20 were finish cut with an aluminum oxide wheel to form the final broach tool. Other finishing operations may also be done but they are deleted herein for the sake of conciseness. As may be seen from FIG. 5, the method of the present invention takes the blank steel material for the broach tool 14, which may have a taper already cut into it, and heat treats the material to harden it before any grinding or cutting operations are attempted. The hardened steel blank 14 is then placed on the numerical control grinding machine 10 and the gullets 20 are cut directly into the hardened steel as was described thus eliminating the rough milling of gullets 52 as required in the prior art methods. This elimination of the rough milling operation is made possible by the use of the CBN 500 coated wheel 12 and the proper use of a coolant properly applied to the wheel 12 by the cooling fluid assembly 42.

Certain modifications and improvements will occur to those skilled in the art upon the reading of this specification. It will be understood that all such modifications and improvements have been deleted herein for the sake of conciseness and readability but are properly within the scope of the following claims.

What we claim is:

1. A method of manufacturing a broaching tool comprising the steps of:

providing a blank piece of steel material suitable for manufacturing a broaching tool;

heat treating said steel material to harden it to a Rockwell C hardness substantially in the range of 63.5 to 67 thereby;

grinding a series of gullets directly into the hardened material with a CBN 500 (cubic boron nitride) grinding wheel to form a series of finished broach cutting teeth therein with said grinding with said CBN 500 grinding wheel being done so as to provide the removal of between 0.06 and 0.09 inches of hardened metal per each cyclic pass of said CBN 500 grinding wheel across the surface of said hardened material at a rate of approximately 2 to 6 inches per minute; and exhausting a synthetic coolant on the face of said CBN 500 grinding wheel at a rate of substantially 30 gallons per minute during the grinding operation.

2. A method of manufacturing as set forth in claim 1 wherein said grinding wheel is rotated at approximately 11,500 surface feet per minute at the periphery of the wheel.

3. A method of manufacturing as set forth in claim 2 wherein said blank piece of metal material is steel and wherein a taper is cut into the blank steel material before it is heat treated.

* * * * *